(12) United States Patent
Rubinstenn et al.

(10) Patent No.: US 8,420,150 B2
(45) Date of Patent: Apr. 16, 2013

(54) COMPACT PLANT POWDER PRODUCT, METHOD OF MAKING SAME, AND USE IN PREPARING A HOT DRINK

(75) Inventors: Gilles Rubinstenn, Paris (FR); Paul Branlard, Lyons (FR); Jacques Brosse, La Grande Croix (FR)

(73) Assignee: Eurotab, St. Just St. Rambert (FR)

( * ) Notice: Subject to any disclaimer, the term of this patent is extended or adjusted under 35 U.S.C. 154(b) by 590 days.

(21) Appl. No.: 12/528,444

(22) PCT Filed: Feb. 26, 2008

(86) PCT No.: PCT/EP2008/052311
§ 371 (c)(1),
(2), (4) Date: Aug. 24, 2009

(87) PCT Pub. No.: WO2008/107342
PCT Pub. Date: Sep. 12, 2008

(65) Prior Publication Data
US 2010/0323083 A1    Dec. 23, 2010

(30) Foreign Application Priority Data

Feb. 26, 2007  (FR) ..................................... 07 01338
Oct. 12, 2007  (FR) ..................................... 07 58272

(51) Int. Cl.
*A23F 5/00* (2006.01)

(52) U.S. Cl.
USPC ............ 426/594; 426/590; 426/597; 426/512

(58) Field of Classification Search ................... 426/594, 426/590, 597, 512
See application file for complete search history.

(56) References Cited

U.S. PATENT DOCUMENTS

| | | | | |
|---|---|---|---|---|
| 2,371,093 A | * | 3/1945 | Willison | 426/454 |
| 3,071,470 A | * | 1/1963 | Bishop | 426/453 |
| 3,121,635 A | | 2/1964 | Eldred | |
| 3,293,041 A | * | 12/1966 | Miller | 426/454 |
| 3,511,666 A | | 5/1970 | Hudson et al. | |
| 3,770,457 A | | 11/1973 | Makwinski et al. | |
| 3,801,716 A | * | 4/1974 | Mahlmann et al. | 426/466 |
| 3,888,999 A | * | 6/1975 | Jones et al. | 426/77 |
| 4,154,864 A | | 5/1979 | Risler et al. | |
| 4,384,005 A | | 5/1983 | McSweeney | |
| 4,975,295 A | * | 12/1990 | Sierra | 426/285 |

FOREIGN PATENT DOCUMENTS

| | | |
|---|---|---|
| BE | 401697 | 3/1934 |
| BE | 792661 | 6/1973 |
| CA | 808588 A | 3/1969 |
| EP | 0 229 920 A1 | 7/1987 |
| EP | 1 977 651 A1 | 10/2008 |
| EP | 1 980 155 A1 | 10/2008 |
| GB | 2 394 164 A | 4/2004 |
| WO | WO 2008/123775 A1 | 10/2008 |

* cited by examiner

*Primary Examiner* — Anthony Weier
(74) *Attorney, Agent, or Firm* — Blakely, Sokoloff, Taylor & Zafman

(57) ABSTRACT

The present invention relates to tablets allowing hot drinks to be prepared by lixiviation and especially coffee. It also relates to the preparation method by which said tablets may be made.

24 Claims, 3 Drawing Sheets

United States Patent US 8,420,150 B2

Figure 1:
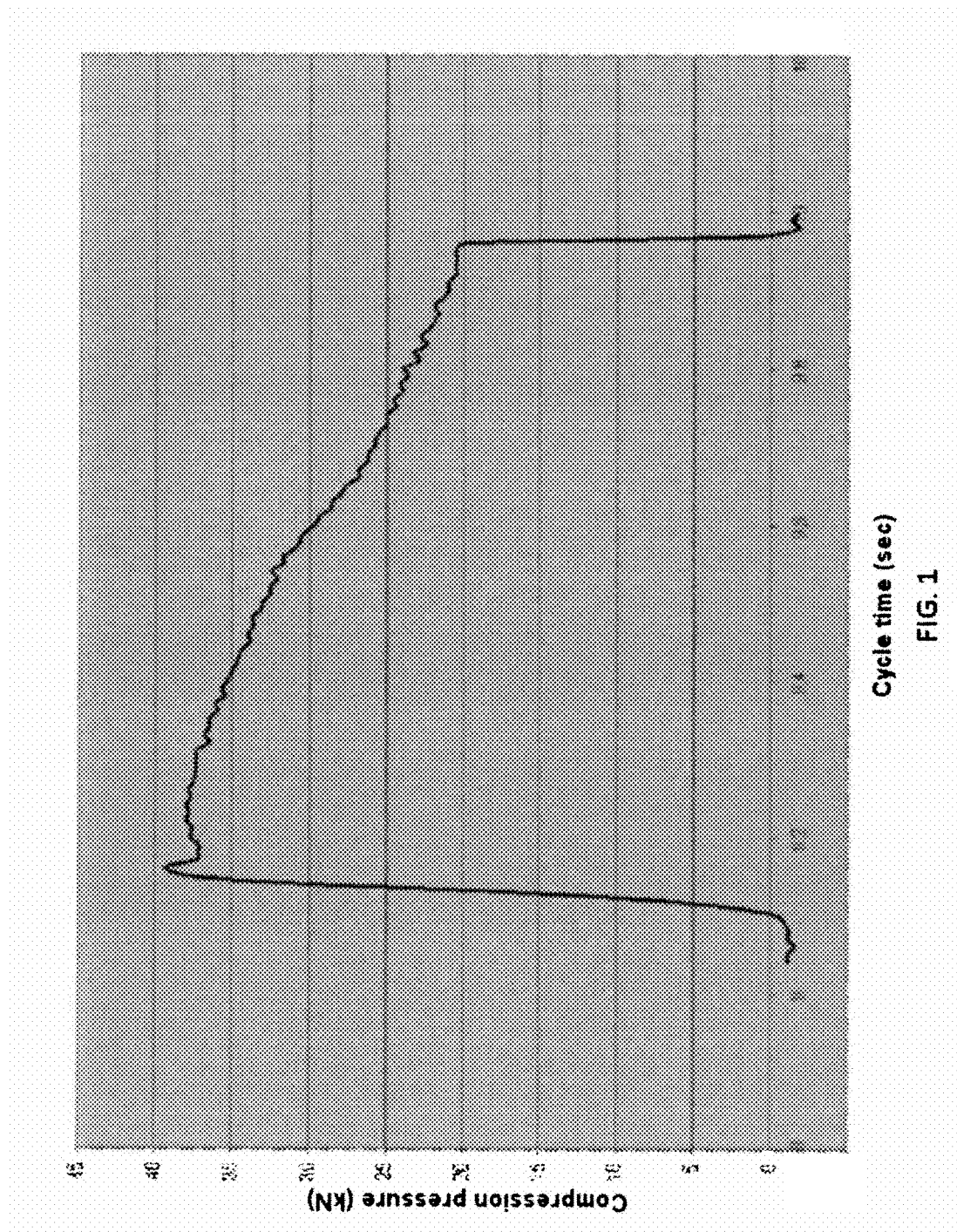

COMPACT PLANT POWDER PRODUCT, METHOD OF MAKING SAME, AND USE IN PREPARING A HOT DRINK

The present patent application is a national phase application of International Application No. PCT/EP2008/052311, filed Feb. 26, 2008.

The present invention relates to tablets with which hot drinks may be prepared by contact with hot water, and especially for coffee. It also relates to the preparation method with which said tablets may be made.

It is known that the ordinary consumer of hot drinks, notably coffee, usually prepares them by either one of percolation, infusion or lixiviation methods. These terms, in their own sense, designate the following operations:

in percolation, there is passing of water as a liquid or vapor through a powder or a solid, the passing being forced under the effect of the pressure applied to the water, in infusion, some solid powder is directly put into the cup from which one should drink, and hot water is poured thereon, and the whole is left to lie for a few minutes. In the case of coffee, this preparation method provides what is known as "Turkish coffee". According to an alternative infusion, the coffee powder is put into a bag which is left to soak in water. Another alternative infusion is practiced in coffee machines especially widespread in the United Kingdom, the powder dwelling in the hot water of the coffee machine and then by an operation consisting of pushing a filtering piston, the dregs may be localized at the bottom of the coffee machine. Certain plants may give rise to a hot drink by decoction, decoction differing from infusion by the fact that the water is at boiling temperature, in lixiviation, the coffee powder is placed in a paper filter borne by a coffee machine; the filter generally has an approximately conical shape and hot water is poured which licks and/or passes through the powder and slowly passes through the paper filter by flowing down under the effect of simple gravity. The coffee machine has the main role of heating the water and of bearing the filter; this is therefore a piece of equipment of great simplicity.

In a particular embodiment, the tablets according to the invention are applied in lixiviation methods for preparing hot drinks. The use of powder is very widespread because it greatly facilitates exhalation of the aroma and of the gustatory properties, but it has a few drawbacks, such as the large volume relatively to the weight, the dosage difficulty, and the dirt when some is dropped during the handling operations.

Turkish coffee has the drawback of leaving the coffee dregs in the cup from which one drinks, which is unpleasant to drink if the dregs pass into the mouth. The use of bags has the drawback of leaving the powder exposed to air before use, and of therefore losing aroma; further the use of a coffee machine with a filtering piston requires having this special type of coffee machine, and if the amount of drink to be prepared is not equal to the volume of the coffee machine, coffee is wasted.

The coffee drink obtained by percolation has the drawback that one has to have this type of coffee machines, often the cups are prepared one by one, which is unpleasant when coffee has to be made for a group of persons. Because of the pressure to be exerted, the equipment has to be solid and relatively costly. This system also has the drawback of making coffee with a determined, often excessive, strength and concentration.

It is therefore very desirable to provide hot drinks based on plant products, specially coffee, in a form adapted to lixiviation (i.e. to the preparation of a hot drink by having hot water pass over a solid ingredient by simple gravity), without however that this form suitable for lixiviation can only be used for preparing a drink by lixiviation.

Making lozenges or tablets of coffee powder was also considered but this goes against the a priori very favorable consideration in favor of powders, which have been mentioned above. Moreover, the patents which have, in spite of this, attempted to produce tablets, had percolation especially in view (U.S. Pat. No. 3,511,666, patent BE 792661, patent application EP0 229 920), and the optional use of bags recommended for containing said tablets was revealing of the poor cohesion of said tablets, this poor cohesion being itself a result of that the suggested methods attempted compression without being too far from the powdery condition favorable to exhalation of aromas and to gustatory properties, said condition being a priori estimated as the most desirable.

However, for reasons of easy transport, handling and use, it is increasingly commonplace to have compact products. Thus, in the field of foodstuffs, attempts are made to transform compounds originally in powdery form into compact products, in order to facilitate their transport, their handling and their use. In particular, by having compact products, the dosage of these compounds may for example be simplified in order to produce decoctions, infusions or lixiviations in water. With the compact form, it is also possible to avoid undesirable dissemination of fine particles and improve the resistance to oxidation of the relevant compounds.

It would be useful to have compact products available, based on natural plant compounds ground beforehand and existing as powders.

However, compaction of such compounds as powders at sufficient rates for allowing their industrial exploitation is made particularly difficult because of the chemical composition of the natural plants of these powders. Indeed, plant compounds present in these powders often comprise polymers, such as for example cellulose, hemicellulose, lignin, which have a strong elastic deformation component. This elastic deformation component causes instability of the products obtained by compacting these plant powders according to standard compaction methods of the prior art; thus the obtained products may be instable, fragile and subject to attrition when a weak compaction force is used. On the contrary, the obtained products have cleavage phenomena and therefore unsatisfactory brittleness, when a high compaction force is used.

Addition of excipients to these plant compound powders may be suggested in order to limit the effects of their elastic deformation component. However, in particular in the field of foodstuffs, these excipients should be able to be ingested. Neither should they alter the taste or the effect of the foodstuff in which they are added.

Thus, there is the need for a method with which powders of natural plant compounds may be industrially compacted in order to obtain manageable compact products having stability and strength which make them easy to transport and handle on the one hand, and a capability of disintegrating in hot water on the other hand, making them opportune for preparing dosed solutions, as for example decoctions.

Document U.S. Pat. No. 3,121,635 describes a method for obtaining compacted tablets from coffee powder. The latter comprises humidification of the powder with water, compaction at constant pressure and then desiccation. This method, comprising addition of water followed by desiccation, however inevitably leads to a loss of aromas.

Patent application EP 0 229 920 also describes a method for compacting coffee powder. Compaction is carried out at a constant pressure of 20.7-48.3 MPa and is accompanied by notable exudation of oils. Upon using these coffee tablets, an alteration of the taste and notably an enhancement of bitterness may however be observed. The alteration of gustatory properties is also illustrated by obtaining after lixiviation, a dry extract yield above the one obtained for coffee powder and therefore more than 100%.

The problem is therefore to develop compact products, based on plant ingredients, resistant to impacts, disintegrating in water and having satisfactory gustatory properties.

The Applicant has now surprisingly noticed that by compacting plant powders at constant volume rather than at constant pressure, it is possible to obtain products both sufficiently resistant and preserving their gustatory properties.

Thus, after decoction, the dry extract yield of the compact products according to the invention is comparable to or less than the yield obtained with the initial plant powders. The gustatory properties of the plant powders are also preserved or enhanced.

It is likely that the methods according to the state of the art include application of too high pressure with the consequence of a modification of the gustatory properties of the obtained products. This "overcompression" is expressed during contact with hot water by too high relative yields of dry extracts. Indeed, from a gustatory point of view, the question is of not preparing "pressed" products but compacted products, the aromas of which will be extracted upon their coming into contact with water notably by percolation, infusion or lixiviation. An object of the present invention is to make compacted products based on plant ingredients in the solid state, preferably based on coffee, allowing hot drinks to be prepared by lixiviation, while nonetheless being usable in percolation or infusion.

Another object of the invention is to provide products for making hot drinks, these products having reduced volume relatively to powders.

Another object of the invention is to propose compacted products, or lozenges, or tablets, providing good exhalation of the aromas and gustatory properties.

Another object of the invention is to make products for hot drinks by lixiviation, notably based on coffee, having reduced bitterness.

Another object of the invention is to propose compacted products with which amounts of hot drinks may be conveniently prepared, corresponding to one or more cups of drinks, the concentration of the drink easily corresponding to the desires of drinkers of said drinks.

Another object of the invention is to propose lozenges, also called tablets, allowing lixiviation with a good rate of extraction of non-aqueous materials.

Another object of the invention is to provide lozenges with good strength during normal handling operations of said lozenges.

Another object of the invention is to provide lozenges easy to make in large series with high productivity.

Another object of the invention is to provide a method for convenient preparation or making said lozenges.

Another object of the invention is to provide a method with which said tablets may be prepared or made with high productivity and at a high rate.

Other purposes and objects of the invention will become apparent during the description which follows.

It was now found that all or part of these objects may be achieved by means of products according to the invention and by means of the method of the invention.

In the present discussion, the separation sign in numerical values between the integer portion and the decimals is the point and not the comma (10.5 represents ten and a half).

The invention therefore relates to a compacted product based on plant ingredients capable of generating a hot drink by contact with hot water, said compacted product being characterized in that:
  a) subject to a temperature of 120° C. for 20 min, it has a loss of volatile materials of more than 2% by weight, preferably comprised between 2 and 10%, and still more preferentially comprised between 3 and 7%,
  b) subject to a temperature ranging from 20° C. to 25° C. at a pressure of 40 megapascals, a loss of mass by exudation of less than 0.1% is observed,
  c) subject to a temperature ranging from 20° C. to 25° C. at a pressure of 100 megapascals, a loss of mass by exudation of more than 0.2% is observed,
  d) its resistance to crushing along a direction parallel to the axis of larger length of the plane of the largest section is comprised between 20 and 70 Newtons, preferably between 30 and 60 Newtons,
  e) its density is comprised between 0.6 and 0.95 g/cm$^3$.

In a preferred embodiment of the invention, the compact product has a relative yield of dry extract after decoction of less than 100%.

Preferably, the invention relates to a compacted product based on coffee powder.

Preferentially, the compacted products according to the invention have a weight comprised between 2 and 30 grams, preferably between 5 and 15 grams.

Additionally, the products of the invention preferentially have an impact resistance such that:
 i. 5 compacted products which are dropped from a height of 1 m on a hard plane surface (such as glass, stone or tiling) give rise to broken or crushed elements having an overall weight of less than 10% of the compacted products
 ii. 5 compacted products which are dropped from a height of 1.5 m on a hard plane surface (such as glass, stone or tiling) give rise to broken or crushed elements having an overall weight of less than 10% of the compacted products.

The products of the invention may therefore generally be used by lixiviation, but may also be used in percolation or infusion.

Advantageously, the invention is applied to the coffee drink, but the invention may also be applied with plant ingredients such as tea or chicory or plant ingredients capable of producing herbal teas such as thymian, rosemary, lime tree blossom, ginseng, ginkgo, marjoram, mint, verbena, ginger, wild yam, plants from the *rosmarinus officinalis* family and mixtures thereof.

The plant compounds applied in the invention generally appear as grains or broken or ground leaves and having possibly been subject to one or more preliminary treatments known per se, such as for example roasting or torrefaction.

According to an advantageous feature of the invention, compacted products are made with at least one curved and convex face, and more preferentially further having a flattened face. An especially advantageous embodiment of the invention consists of having a compacted product like a coffee bean, in which case the flattened face of the bean includes a longitudinal groove. This groove may promote lixiviation.

The compacted products according to the invention may be considered as being lozenges or tablets and correspond to the English word of tablet.

They may be used by infusion or percolation, but they have the significant advantage of being usable for lixiviation, while giving a good yield of lixiviated extract. An advantageous feature of the products of the invention is to have a relative yield of lixiviated extract of generally more than 50%, preferably more than 60%, and still more preferentially more than or equal to 75%. The products according to the invention may advantageously be used without any particular enclosure.

The products according to the invention may disintegrate, or even return to the (humid of course) powder condition during lixiviation.

The object of the invention is also a method for preparing or making compacted products, especially compact products based on coffee powder, comprising the following steps:
 a) a plant compound powder capable of giving rise to a hot drink by lixiviation is placed in a confined space,
 b) said powder is compacted down to a reduced volume comprised between 15 and 60% of the initial volume, preferably between 20 and 45%,
 c) the compaction stress is maintained at substantially constant volume,
 d) the compaction stress is released.

According to the invention, it is preferred that the initial volume reduction be accomplished for a duration of 0.1 to 2 seconds, preferably from 0.2 to 0.8 seconds; as for the compaction stress, once the final volume is obtained, it is maintained preferably for a duration of 0.2 to 5 seconds, more preferentially between 0.3 and 2 seconds, and even more preferentially between 0.5 and 1.5 seconds.

Preferentially, the compaction stress at constant volume is maintained at least until the powder has lost its elasticity.

The amount of powder applied in the invention is advantageously comprised between 2 and 30 grams, preferably between 5 and 15 grams.

In the invention it was also discovered that absence of any prior degassing of the powder is favorable to making products of the invention, prior degassing often produces brittleness by a tendency to cleavage and/or to loss of aromas and/or gustatory properties.

Compaction according to the invention is preferably carried out with a compacting (or forming) system in which the applied pressure is transmitted by displacement over a determined length of one or two walls (sometimes called a punch) surrounding the material to be compacted.

An advantageous embodiment according to the invention consists of applying a cam press, i.e. wherein the displacement of the wall(s) of the confinement space is determined by a connecting rod, the movement of which is determined by a cam, the results of the invention being more easily obtained than if one attempts to use a hydraulic press.

These presses advantageously include an extruder type tube, with a punch on one end, or a punch at each end.

The powder used for compaction is advantageously either one of the existing or marketed powders for making the plant drink by lixiviation or percolation, preferably the coffee drink. These products are known per se and preferentially consist of ground and roasted or torrefied coffee, optionally mixed with additives or chicory. These starting products, or powder, applied in the invention have a humidity content of the order of 3-10% by weight; are subject to a temperature of 120° C. for 20 min, they have a loss of volatile materials of more than 2% by weight, preferably comprised between 2 and 10% and even more preferentially comprised between 3 and 7%.

In the case of coffee, it is known that green coffee is obtained by shelling coffee beans, that these beans are then torrefied (strongly heated, the term used is also burning or grilling), which develops their aroma and gives them their dark color. The beans approximately double their size with torrefaction. They are then ground in order to obtain a coffee powder for which the particle size is generally of the order of 0.1 to 3 mm on average, preferably 0.2 to 2 mm; the powder has a mass loss, at 110° C. for 20 minutes, of generally more than or equal to 2%. The density of the obtained ground coffee is generally less than or equal to 0.6, preferably less than or equal to 0.4.

The present invention allows the preparation of compact products, in particular for use in the field of foodstuffs, which are stable, resistant, therefore easy to handle and store and disintegrable in water, in particular in hot water.

The compact products according to the invention are capable of generating a drink by contact with water, notably by percolation, decoction, infusion, or lixiviation.

In the present application, the loss of mass is measured according to the following method: the sample is weighed and its initial mass is noted. The sample is brought to 110° C. for 20 minutes. Its final mass is then measured. The percentage of lost mass between the final and the initial mass is then calculated.

In the present application, the grain size of a powdery composition or powder is defined by the average diameter of the particles making up this powdery composition or this powder.

By "loss of volatile materials" is meant the loss of steam or of all the other volatile compounds.

In the present application, the apparent density is defined by the specific gravity of the composition which is mass referred to a unit volume in the condition of its presentation (expressed in $g/cm^3$). As an example, the density of water is equal to 1.

The relative yield of lixiviated extract is the relative ratio for the compacted product relatively to the powder obtained by simple manual crushing of this compacted product, this ratio being the quotient of the lixiviated extracts under similar conditions (generally slow lixiviation of the order of 5 min with water at about 90° C.), and then dried by evaporation of water.

In the methods according to the present invention, the powder is compacted down to a reduced volume and the compaction stress is then maintained at constant volume (the compaction volume). The reduced volume (the compaction volume) is advantageously less than or equal to the final volume of the tablet.

The time for maintaining the compaction stress at constant volume is essential for obtaining satisfactory compact products. This time for maintaining the compaction stress may be determined experimentally.

Advantageously, the applicant has found that the compaction stress should be maintained at least until the plant compound powder has lost elasticity. Indeed, plant ingredients have an elastic property which enables them to resume their shape and their initial volume after disappearance of a stress. The main property of elasticity is of being reversible. Upon maintaining a compaction stress on a powder of plant ingredients, the Applicant observed the existence of a failure point (or compaction point) beyond which the power loses its elasticity. This failure point may be determined by the person skilled in the art by measuring the resistance of the powder when maintaining the compaction stress. Thus, by measuring the compressive force over time, the compression curve of a given plant powder may be determined. This compression curve is specific to each plant powder depending on its elasticity, its humidity content, etc.

The compaction stress should be maintained at constant volume for a determined period longer than the period required for reaching the compaction point. This compaction point is locatable in the compression curve.

The object of the invention is therefore a method for preparing a solid compact product from a powdery composition in the form of a compound product with a determined volume, comprising the following steps:
- placing the powdery composition in a confined space having the shape of said compact product of determined volume,
- compacting said powdery composition to a compaction volume smaller than or equal to the determined volume,
- maintaining said composition compressed to said compaction volume for a determined period for exceeding a compaction point, and
- releasing the compaction stress.

The examples and figures, given as being non-limiting, illustrate the invention and show how it may be applied.

FIGURES

Figure 2:
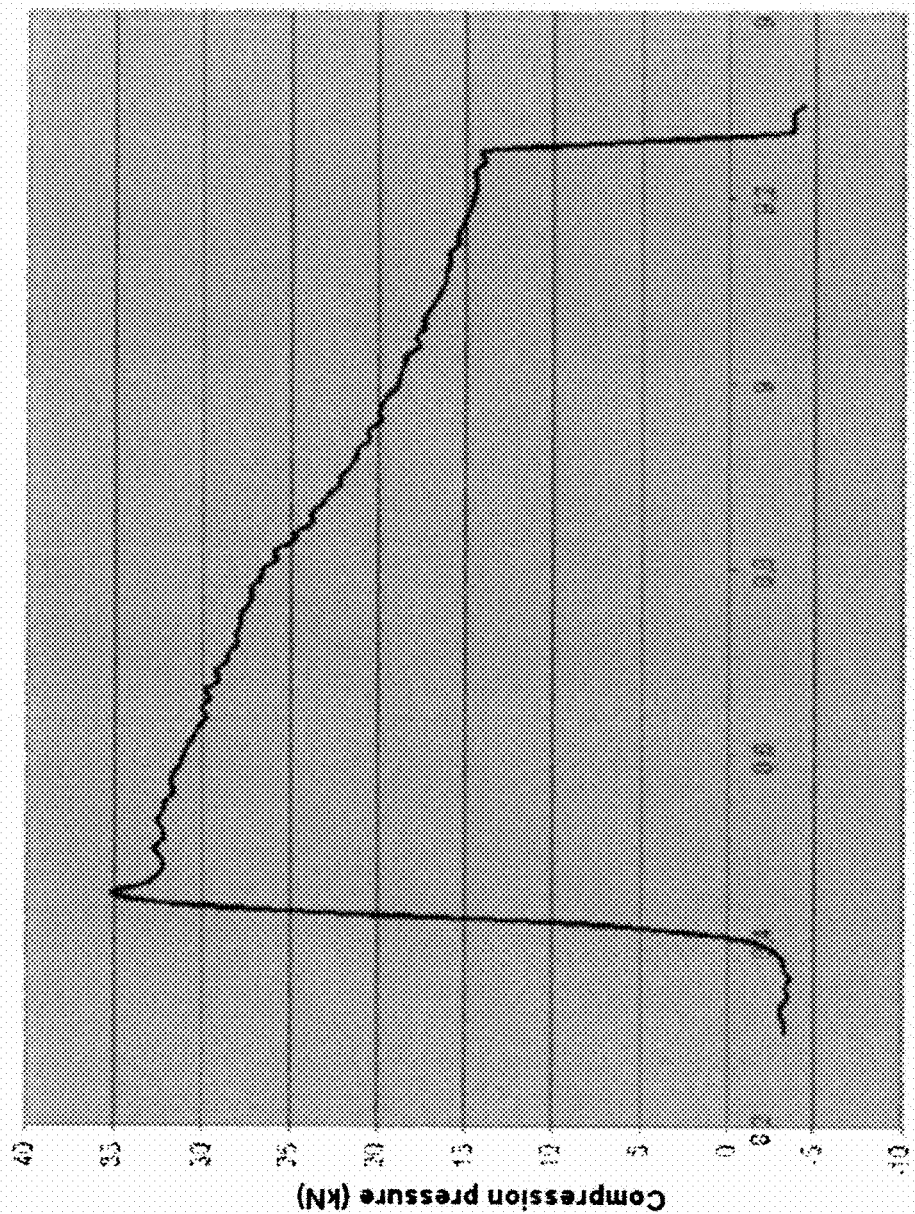
Figure 3:
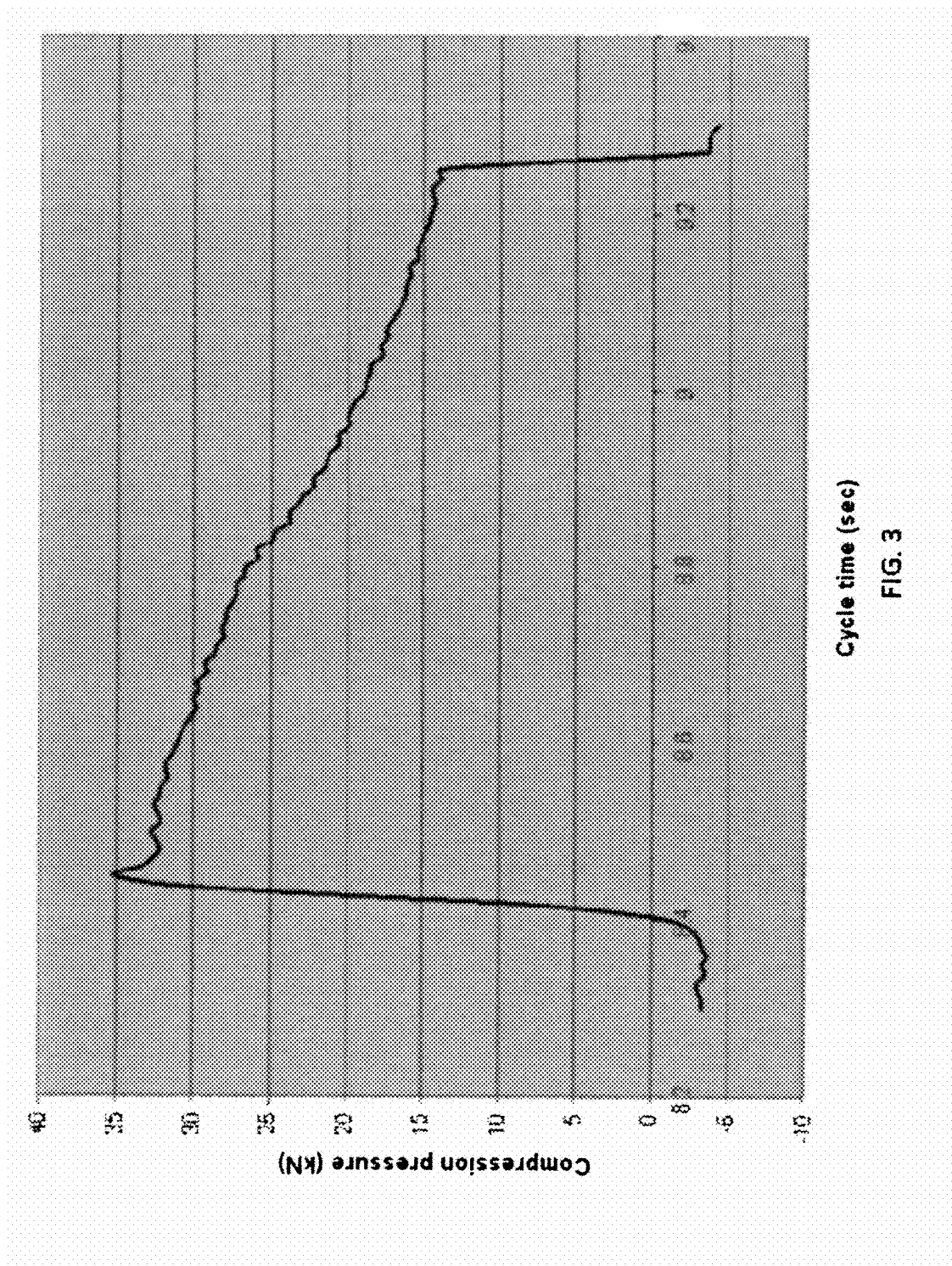

FIG. 1: Compression curve of the coffee of Example 1
FIG. 2: Compression curve of the coffee of Example 2
FIG. 3: Compression curve of the coffee of Example 3

EXAMPLE 1

Roasted coffee, ground to an average grain size of 1 mm, and having a 4% loss of volatile materials after dwelling for 20 min at 120° C., is compacted with a compacting system allowing a controlled constant volume to be attained. 7 g of powder are reduced down to 30% of their initial volume within 0.4 seconds, and this volume is maintained for 0.85 seconds. A cylindrical flat tablet is obtained with a density of 0.76 g/cm$^3$. This tablet has a 4% loss of volatile materials after dwelling for 20 min at 120° C.; under 40 megapascals at 20° C., it exudes 0.05% oil; under 100 megapascals at 20° C. it exudes 0.25% oil. A force of 50 Newtons is applied along a transverse diameter; the tablet is not damaged. 5 similar tablets fall from 1.5 m and give a weight loss by breakage of more than 30%; 5 other tablets falling from 1 m only give a weight loss of 3%.

Four similar tablets are placed in a paper filter with an overall conical shape, but having a linear edge in the place of the pointed and point-like apex (an edge perpendicular to the axis of the cone); these filters are known and marketed for coffee machines operating via lixiviation.

Hot water at 80° C. is produced by an electric coffee machine and 500 cm$^3$ of this is passed over theses tablets in the filter. A coffee with an aroma equivalent to the one obtained with powdered coffee is collected, with reduced bitterness.

The ratio of the amount of lixiviated dry extract amount among the drinks obtained from tablet and from powder respectively is 85%.

EXAMPLES 2 TO 9

Example 1 is reproduced with different operating conditions. These conditions and the obtained results are indicated with those of Example 1, in the following table, the other conditions and results being the same as in Example 1.

| EXAMPLE | 1 | 2 | 3 | 4 | 5 | 6 | 7 | 8 | 9 |
|---|---|---|---|---|---|---|---|---|---|
| Amount of powder used in grams | 7 | 7 | 7 | 7 | 7 | 6 | 8 | 7 | 7 |
| Compaction with volume reduction of the powder (expressed in percent) | 30 | 30 | 30 | 30 | 30 | 30 | 30 | 40 | 20 |
| Duration of compaction in seconds before reaching the minimum final volume | 0.4 | 0.4 | 0.4 | 0.4 | 0.4 | 0.4 | 0.4 | 0.4 | 0.4 |
| Duration of pressurization at constant volume in seconds (of the tablet) | 0.85 | 0.65 | 0.85 | 0.85 | 1.1 | 1.1 | 0.65 | 1.1 | 0.65 |
| Density of the produced tablet in g/cm$^3$ | 0.76 | 0.69 | 0.82 | 0.65 | 0.87 | 0.63 | 0.81 | 0.69 | 0.90 |
| Loss in volatile materials of the initial powder and of the final powder within 20 min at 120° C. (in percent) | 4 | 4 | 6 | 3 | 4 | 4 | 4 | 4 | 4 |
| Exudation at 40 megapascals in percent | 0.05 | 0.05 | 0.05 | 0.05 | 0.05 | 0.05 | 0.05 | 0.02 | 0.02 |
| Exudation at 100 megapascals in percent | 0.245 | 0.245 | 0.28 | 0.21 | 0.245 | 0.21 | 0.315 | 0.22 | 0.26 |
| Applied force in Newtons, along a transverse diameter without there being any breakage | 50 | 40 | 55 | 35 | 60 | 33 | 55 | 40 | 60 |

| EXAMPLE | 1 | 2 | 3 | 4 | 5 | 6 | 7 | 8 | 9 |
|---|---|---|---|---|---|---|---|---|---|
| Weight loss by breakage of 5 tablets falling from 1 m | 3 | 4 | 3 | 5 | 1 | 3 | 2 | 4 | 1 |
| Weight loss in % by breakage of 5 tablets falling from 1.5 m | >30 | >40 | >20 | >40 | >20 | >35 | >28 | >50 | >15 |
| Percentage of amount of lixiviated dry extract of the drink obtained with a tablet as compared with the drink originating from the powder | 85 | 90 | 80 | 82 | 81 | 80 | 93 | 94 | 80 |

The invention claimed is:

1. A compacted product based on plant ingredients capable of generating a hot drink by contact with hot water, said compacted product being characterized in that:
   a) subject to a temperature or 120° C. for 20 min, it has a loss of volatile materials of between 2 and 10%,
   b) subject to a temperature ranging from 20° C. to 25° C. at a pressure of 40 megapascals, it has a mass loss by exudation of less than 0.1%,
   c) subject to a temperature ranging from 20° C. to 25° C. at a pressure of 100 megapascals, it has a mass loss by exudation of more than 0.2%,
   d) its resistance to crushing along a direction parallel to the axis of the largest length of the plane of largest section is between 20 and 70 Newtons,
   e) its density is between 0.6 and 0.95 g/cm$^3$,
   f) its dry extract yield after decoction is less than 100% of the dry extract yield after decoction of the plant powder.

2. The product according to claim 1, wherein the plant ingredients comprise roast and ground coffee.

3. The product according to claim 1, wherein its weight is between 2 grams and 30 grams.

4. The product according to claim 1, having an impact resistance such that:
   a. a plurality of compacted products which are dropped from a height of 1 m on a hard plane surface give rise to broken or crushed elements having an overall weight of less than 10% of the compacted products,
   b. a plurality of compacted products which are dropped from a height of 1.5 m on a hard plane surface give rise to broken or crushed elements having an overall weight of less than 10% of the compacted products.

5. The product according to claim 1 having at least one curved face and at least one convex face.

6. The product according to claim 1, further comprising a flattened face, wherein the flattened face includes a longitudinal groove, the overall shape being that of a coffee bean.

7. The product according to claim 1 with a dry extract yield after decoction of more than 50% of the dry extract yield after decoction of the plant powder without compaction.

8. A method for preparing a compact product, comprising the following steps:
   a. placing in a confined space a plant compound powder capable of giving rise to a hot drink by lixiviation,
   b. compacting said powder down to a reduced volume, said reduced volume being a volume which is between 20% and 60% of the initial volume,
   c. once the reduced volume is reached, maintaining said compacted powder at said reduced volume for a period of 0.2 second to 5 seconds,
   d. after said period has expired, releasing the compaction stress heated during said compacting.

9. The method according to claim 8, wherein the reduction of the initial volume occurs for a period of 0.1 to 2 seconds, and that the reduced volume is maintained constant for a period of between 0.3 seconds and 2 seconds.

10. The method according to claim 8 wherein the reduced volume is maintained constant at least until the powder loses elasticity.

11. The method according to claim 8, wherein the amount of applied powder is between 2 grams and 30 grams.

12. The method according to claim 8, wherein the compacting is carried out with a compaction system, wherein the applied pressure is transmitted by displacement over a determined length of one or two walls surrounding the material to be compacted.

13. The method according to claim 8, wherein the powder used during said compacting is roast and ground coffee having a humidity content of 3 to 10% by weight.

14. The method according to claim 8, wherein the powder used during said compacting is roast and ground coffee, the particle size of the powder being from 0.2 mm to 3 mm on average.

15. A compact product obtained according to a method comprising the following steps:
   a. placing a plant compound powder capable of giving rise to a hot drink by lixiviation in a confined space,
   b. compacting said powder down to a reduced volume, said reduced volume being a volume which is between 20% and 60% of the initial volume,
   c. once the reduced volume is reached, maintaining said compacted powder at said reduced volume for a period of 0.2 second to 5 seconds,
   d. after said period has expired, releasing the compaction stress heated during said compacting.

16. A method for preparing a hot drink based on coffee wherein lixiviation of a product obtained according to claim 15 is carried out.

17. The method according to claim 8, wherein the plant compound powder loses between 2% and 10% by weight of volatile material when subject to a temperature of 120° C. for 20 min.

18. The product according to claim 15, wherein the plant compound product is roast and ground coffee.

19. The product according to claim 15, wherein the plant compound product is one of tea, chicory, or plants capable of making herbal teas,
wherein said plants capable of making herbal teas are at least one of thymian, rosemary, lime tree blossom, ginseng, ginkgo, marjoram, mint, verbena, ginger, wild yam, plants from the *rosmarinus officinalis* family.

20. A method for preparing a compact product of a determined volume, comprising the following steps:
 a. placing a plant compound powder capable of giving rise to a hot drink by lixiviation in a confined space,
 b. compacting said powder down to a reduced volume, said reduced volume being a volume which is smaller than or equal to the determined volume, wherein said reduction occurs for a period of 0.1 second to 2 seconds,
 c. once the reduced volume is reached, maintaining said compacted powder at said reduced volume for a period of 0.2 second to 5 seconds,
 d. after said period has expired, releasing the compaction stress heated during said compacting.

21. The method according to claim 20, wherein the compound plant powder is roast and ground coffee.

22. A compact product of a determined volume obtained according to a method comprising the following steps:
 a. placing a plant compound powder capable of giving rise to a hot drink by lixiviation in a confined space,
 b. compacting said powder down to a reduced volume, said reduced volume being a volume which is smaller than or equal to the determined volume, wherein said reduction occurs for a period of 0.1 second to 2 seconds,
 c. once the reduced volume is reached, maintaining said compacted powder at said reduced volume for a period of 0.2 second to 5 seconds,
 d. after said period has expired, releasing the compaction stress heated during said compacting.

23. The product according to claim 22, wherein the plant compound powder is roast and ground coffee.

24. A method for preparing a compact product, characterized in that it comprises the following steps:
 a. placing a plant compound powder capable of giving rise to a hot drink by lixiviation in a confined space,
 b. compacting said powder down to a reduced volume, said reduced volume being a volume which is between 20% and 60% of the initial volume,
 c. once the reduced volume is reached, maintaining said compacted powder at said reduced volume for a period of 0.2 second to 5 seconds,
 d. releasing the compaction stress,
wherein the method does not comprises any prior phase for degassing the powder.

* * * * *

UNITED STATES PATENT AND TRADEMARK OFFICE
CERTIFICATE OF CORRECTION

PATENT NO. : 8,420,150 B2  
APPLICATION NO. : 12/528444  
DATED : April 16, 2013  
INVENTOR(S) : Rubinstenn et al.

Page 1 of 1

It is certified that error appears in the above-identified patent and that said Letters Patent is hereby corrected as shown below:

On the Title Page, in Item [75], under Inventors, at line 2, please delete "Lyons" and insert --Lyon--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,420,150 B2
APPLICATION NO.   : 12/528444
DATED             : April 16, 2013
INVENTOR(S)       : Gilles Rubinstenn, Paul Branlard and Jacques Brosse Page 1 of 1

It is certified that error appears in the above-identified patent and that said Letters Patent is hereby corrected as shown below:

In the Claims,

Column 9, Claim 1, line 24, please delete "or" and insert --of--.

Signed and Sealed this
Ninth Day of September, 2014

Michelle K. Lee
*Deputy Director of the United States Patent and Trademark Office*